July 27, 1965  E. J. RIPLING  3,196,531
METHOD OF LOCATING HIDDEN REGIONS IN COMPOSITE LAMINATE
STOCK, AND PRODUCT
Filed June 24, 1963  5 Sheets-Sheet 1

INVENTOR
EDWARD J. RIPLING

BY *Mason, Porter, Diller & Stewart*

ATTORNEYS

INVENTOR
EDWARD J. RIPLING
BY Mason, Porter, Diller & Stewart
ATTORNEYS

July 27, 1965 E. J. RIPLING 3,196,531
METHOD OF LOCATING HIDDEN REGIONS IN COMPOSITE LAMINATE
STOCK, AND PRODUCT
Filed June 24, 1963 5 Sheets-Sheet 3

INVENTOR
EDWARD J. RIPLING

BY Mason, Porter, Diller & Stewart,
ATTORNEYS

INVENTOR
EDWARD J. RIPLING

BY *Mason, Porter, Diller & Stewart,*
ATTORNEYS

INVENTOR
EDWARD J. RIPLING

BY *Mason, Porter, Diller & Stewart*

ATTORNEYS

3,196,531
METHOD OF LOCATING HIDDEN REGIONS
IN COMPOSITE LAMINATE STOCK, AND
PRODUCT
Edward J. Ripling, Flossmoor, Ill., assignor to Continental Can Company, Inc., New York, N.Y., a corporation of New York
Filed June 24, 1963, Ser. No. 289,958
15 Claims. (Cl. 29—407)

This invention relates to the making and severance of composite laminate stock along predetermined severance lines relative to the location of internal discontinuities of the composite laminate stock.

"Composite laminate stock" is employed in this disclosure as defining a rolled material having metal laminations separated by anti-welding or resist layers of restricted areas which have prevented the metal laminations from adhering or welding together during the course of the rolling at regions outside of and in the planes of such resist layers. The production of such material is known, and such stock is later expanded or opened into tubular or like form by moving the laminations apart by mechanical or fluid means, by bending or stretching the metal.

It is known to prepare billets having longitudinally extending internal channels containing such anti-welding material, with the surface metal of the billets connected integrally by metal spacer portions located between the lateral edges of such internal channels, and to roll the billet to form a strip having internal discontinuities provided by the residual layers of the anti-welding material, and then to move the metal surface laminations apart to provide internal longitudinal passages either with or without previously severing the strip longitudinally through the rolled residues of such integrating spacer portions. In cases where the tubes are to be narrow, it is a practice to provide a billet having a number of longitudinally extending and laterally spaced internal channels for receiving the resist material. Thus when an available rolling mill has rollers 36 inches long, and the tubes are to be 3 inches in diameter and formed by bending the laminations apart, the billet may have seven such channels, each about 4¾ inches wide, with solid metal between the edges of the channels which are located essentially at the median plane of thickness of the billet. Such an ingot may be cast, in steel, in aluminum or aluminum alloy, in copper, or other metal, with removable cores to provide the channels to be later charged with resist material, or may be cast about bars of frangible refractory powder material contained in envelopes of metal compatible with the ingot metal, or the billet may be cast and the channels formed by drilling, broaching and like operations ready to receive the resist material. The billet may be up to 8 inches or more in thickness: and during the rolling schedule may be reduced to a strip in which the total thickness may be 20 mils or less, comprising metal laminations of about half this thickness, and with the residue of the resist material forming a layer so thin that it may be essentially invisible at an edge cut transversely across the rolled strip and, of course, is invisible through the metal laminations.

In splitting the rolled strip to narrower widths, without intruding upon the internal channels, in cutting shapes from such strips and pre-selected lines relative to the edges of such internal channels, and in clamping such strips at points outside the regions of such hidden internal channels, it is desirable to have guides which do not depend upon tentative location of the ends of the channels, exposed by transverse severances of the rolled strip, and partial expansions or openings thereat.

It has also been proposed to provide in such integrating spacer portions weaknesses formed by internal and external lines of anti-welding material, with such weaknesses extending for significant proportions of the thickness of the billet so that like significant portions of the rolled strip comprise weakenings by which the strip may be severed longitudinally along such weakenings of the rolled strip by stressing the strip at the lateral margins of such weakenings, as by bending. When it is desired to sever the strip, or sections cut therefrom along transversely extending lines, or to effect expansions, at certain parts of the strip length but without significant weakening of other parts of the length, such full-length weakenings can lead to the trouble of propagation of the ruptures into such other parts.

According to the instant invention, linear regions of the billet are provided with indicating material for depths which do not significantly decrease the strength of the rolled strip but provide detectable regions located at predetermined relations to the edges of the internal anti-welding residues.

An object of the present invention is a method and a composite laminate stock product thereof, in which concealed internal portions of the stock can be located from the exterior by employment of markings applied to the billet prior to rolling to form such stock, and without creating a significant weakening of the stock.

Another object of the invention is a method and a composite laminate stock product thereof, by which essentially invisible markings are present in or on such stock, and can be detected externally without weakening or deformation of the rolled stock.

A further object of the invention is the provision of composite laminate stock with essentially invisible markings for designating the location of concealed internal portions, and means for severing the stock along predetermined lines and under control of such markings.

With these and other objects in view, as will appear in the course of the following description and claims, illustrative embodiments of the invention are shown in the accompanying drawings, in which:

FIGURE 1 is a perspective view of a billet by which the invention may be practiced;
FIGURE 2 is a perspective view of a strip made by rolling the billet of FIGURE 1;
FIGURE 3 is an end view of a billet, showing the employment of surface grooves for reception of tracer material;
FIGURE 3A is a perspective view of a strip made by rolling the billet of FIGURE 3;
FIGURE 4 is an end view of a billet having an internal tracer stripe and formed by casting;
FIGURE 5 is a perspective view of a part of a spacer piece as employed in FIGURE 4;
FIGURE 6 is an end view of a rolled strip as prepared from a billet as in FIGURE 4;
FIGURE 7 is a conventionalized view of an apparatus for detecting and marking a rolled strip, with radiographic means for the detection;
FIGURE 8 is a conventionalized view showing a magnetic detection of a pre-disposed marking in a rolled sheet;
FIGURE 9 is a like conventionalized view, showing detection of a fluorescent tracer;
FIGURE 10 is an end view of a billet prepared by roll-bonding assembled elements;
FIGURE 11 is a perspective view, in exploded form of an embodiment in which printed metal sheets are roll-bonded;
FIGURE 12 is a like view of the roll-bonded assembly from FIGURE 11;
FIGURE 13 is an upright sectional view of a clamping device, with an assembly as in FIGURE 12 in place;

Figure 1:
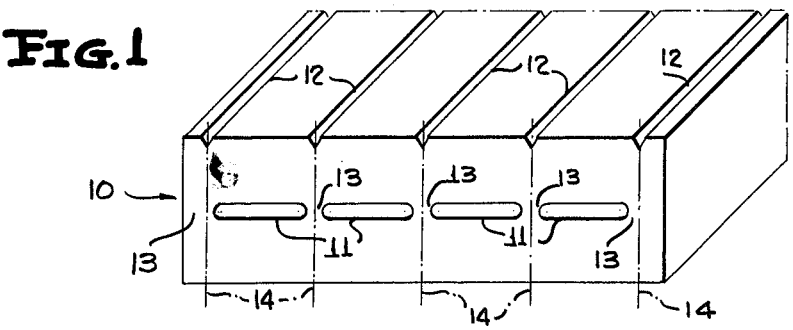
Figure 2:
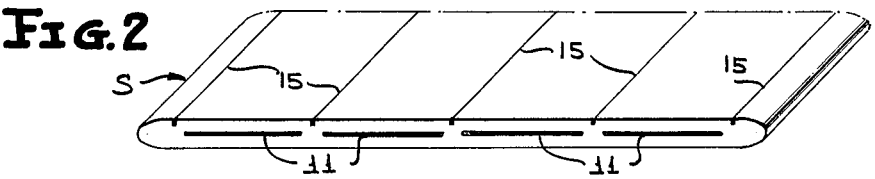

In the embodiment of FIGURES 1 and 2, a billet 10 is prepared by extrusion or by casting with longitudinal channels 11 formed by employment of the bars of frangible refractory material, or by removable cores to provide channels which can later be charged with anti-welding or resist material. Surface grooves 12 are formed longitudinally in one or both roll-engaging surfaces of the billet, as by milling or during the course of casting or extrusion while the locations of the channels are clearly apparent. Charges of tracer material are placed in such grooves, as slurries which are later dried, as sprayed metal or metal oxide deposits, or in other fashion to provide sufficient adhesion to prevent loss during later working. These grooves may be located opposite the solid metal spacing regions 13 between adjacent edges of the channels 11, or elsewhere, noting that they are small in section and cause no significant longitudinal weakening of the billet so that the billet, or the strip S rolled therefrom, has no tendency to split therealong. Where a number of billets of like section and material are being subjected to identical schedules of heating and rolling, so the cross-sections of the rolled strips are identical, it is feasible to provide a single groove 12 and resultant stripe 15 (FIG. 2) of tracer material; and to accomplish severances and cutting of the strip at various places by measurement from the single tracer. During rolling, the metal at roll-contacted surfaces is caused to move relatively laterally to close the grooves.

Upon rolling to form a strip S as in FIGURE 2, the surface grooves and internal channels are essentially invisible; their dimensions being exaggerated in the drawings.

Figure 3:
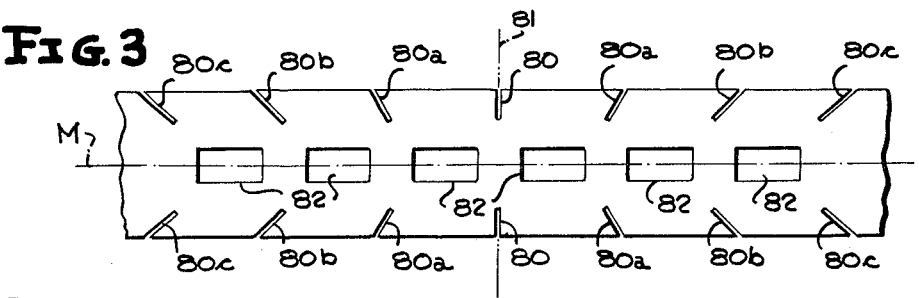
Figure 3A:
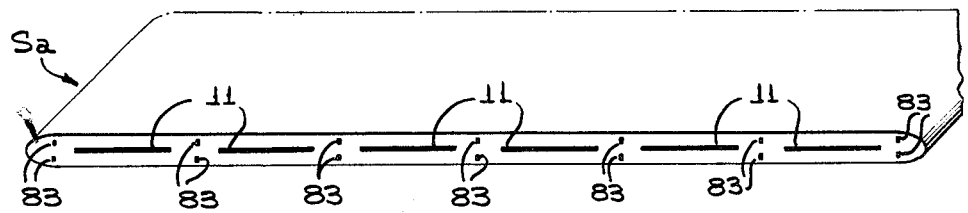

In the practice indicated in FIGURE 3, deep and narrow grooves are cut from each roll-engaging surface of the billet, for receiving tracer material, noting that the grooves 80 at the center of width of the billet are located in the upright plane 81 which passes between the adjacent edges of the two cores 82 which are spaced at like distance from this upright central plane 81. The grooves 80a and 80b located further from the central plane having successively greater angles or tilts relative to the billet surfaces so that their roots are located nearer the center of width than their outer edges: and each pair of grooves has its roots lying opposite the metal between two adjacent cores 82. Like grooves 80c may be provided adjacent the lateral edges, to indicate where the margins of the strip may be removed without severance into the side-most channels. With this form, the grooves 80, 80a, 80b, 80c need not be filled with tracer material, but such can be placed at the roots of the grooves, and the mouths of the grooves then peened or welded to enclose the tracer material so it does not escape or settle during the later rolling. During the course of the rolling, there is a differential lateral spreading at the successive planes parallel to the roll engaged surfaces of the billet. The surfaces of the billet have no significant widening during rolling, but the median plane M widens most, with successive planes between M and the two surfaces having lesser widening so that ultimately the edges of the rolled strip are rounded as shown in FIGURE 3a. Therewith the grooves 80a, 80b tend to become upright, and their roots come to positions intermediate the edges of the two adjacent cores 82—82. Such an ingot can be cast with removable cores, with the cores 82, formed of frangible bars such as refractory powders held by temporary binders, by drilling with or without broaching, or by extrusion. The total depths of the surface grooves should be sufficient to receive adequate amounts of tracer material, and to allow closing of the mouths so the locations of the grooves are essentially invisible: but not deep enough so that there is weakness or liability of the billet to split during rolling or for the rolled strip to exhibit significant weakness: the distance between the roots of the opposed grooves of a pair should be at least half the thickness of the ingot.

Upon rolling the billet of FIGURE 3 a strip Sa is formed as in FIGURE 3a. Where the thickness of the channel residues 11 is exaggerated as in FIGURE 2: and the tracer material at the bottoms of grooves 80, 80a, 80b, 80c now provides internal lines or stripes 83. In many practices, the grooves need only be formed at one surface of the billet, and correspondingly a single internal line 83 is then obtained.

The practice of having the tracer or marker stripes internal as in FIGURES 3 and 3a, compared to the surface location of FIGURES 1 and 2, is preferred when the materials employed as tracer or marker are hard and abrasive, e.g., when aluminum oxide is used with steel ingots for radiographic detection, the particles can abrade and roughen the rolls employed for reducing the billet to strip form. Further, the materials can be dislodged from surface grooves before they are embedded within the metal being rolled, and such dislodged particles can be pressed into the surface at undesirable locations, so that later false responses may be made during the detection of the marker materials.

Figure 4:
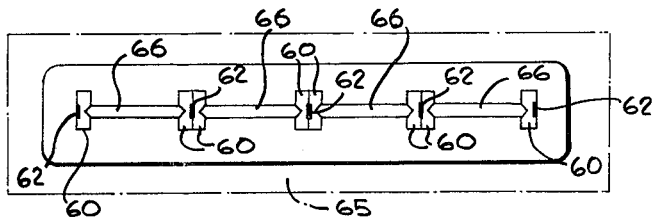
Figure 5:
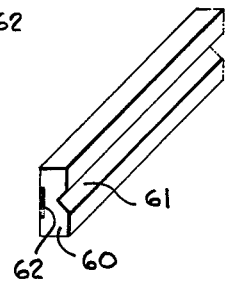

The tracer materials can also be placed within the billets as at the plane of the channels as shown in FIGURES 4 and 5. Thus a series of spacer pieces 60, FIGURE 5, may be rolled or extruded of a metal compatible with the metal to be poured in forming the ingot. Thus for steel ingots, the pieces may be of the same analysis or of a lower-carbon steel; for aluminum or magnesium ingots, the pieces can be of the same analysis or of an alloy which is more ductile, or even of the pure metal itself; for copper or brass ingots the pieces may be of the same analysis or of pure copper. The pieces 60 in FIGURE 5 are illustratively shown as having grooves 61 at one face, and a coating 62 of the tracer material at the other face, e.g., occupying only a part of this face. These are assembled in pairs, back-to-back in a casting mold 65, shown by dash lines in FIGURE 4, alternately with the removable core pieces 66 having edges closely conforming to the grooves 61 of the pieces 60. Single pieces 60 are employed at the lateral edges of the assembly, so tracer material 62 is present outside the lateral-most core pieces 66 to provide tracer stripes corresponding to the lateral-most tracer stripes 15 in FIGURE 2, at which the lateral edges of the rolled strip may be marked for later removal at predetermined distances from the outer edges of the side-most channels provided by the core pieces 66. After casting the ingot, the core pieces 66 are withdrawn, and the ingot can be scalped, charged with resist material in its channels, and subjected to a schedule of heating and rolling operations to provide a rolled strip Sb as in FIGURE 6. The resist layers 11 are located in a median plane, with their edges spaced from one another by residues of the rolled spacer pieces 60, and with the residues 68 of the tracer material located accurately at predetermined positions between the adjacent edges of the layers 11 and from the lateral edges thereof.

Figure 6:
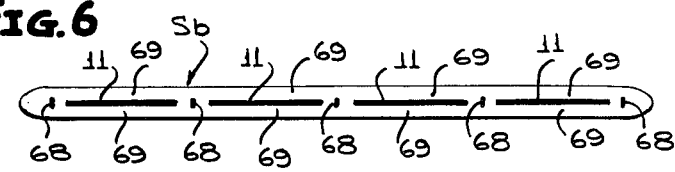

The spacer pieces 60 in FIGURE 4 become integrated with the molten metal as cast and assure ample strength, without bubbles or pores, at the edges of the cores, and thus provide integral connections between the metal layers or laminations 69 which are separated by the resist residue layers 11 in FIGURE 6. The dimension of the residue of the tracer material 68, in the rolled strip, can be about 5 percent of the total thickness of the strip, e.g., 0.0008 inch for a strip 0.016 inch thick, and hence there is no significant weakening of the strip nor tendency for it to split along a line of such tracer material. As low as 2 percent of the thickness permits detection.

The tracer stripes may have a transverse dimension of 5 mils: and therewith the location can be detected with a like tolerance of accuracy.

The material useful as a tracer or marker substance depends upon the metal employed for the billet and rolled strip. In general, magnetic detection is difficult with iron and steel strips. For such, aluminum oxide, either in surface grooves as in FIGURES 1 and 2, or in internal regions as in FIGURES 4–6 can be employed, with radiographic detection.

With radiographic detection, it is preferred to have the tracer material as widely different in atomic number from the base metal as economically feasible. Thus, the coefficient of X-ray absorption varies with the fourth power of the atomic number. Hence with billets of metal of high atomic number, a tracer of low atomic number has greater transparency to the X-radiation, and a detector responding to the greater amount of radiation passed is effective to indicate the location of the tracer. With billets of the lighter metals, tracers of metal of high atomic number are preferred, for distinctive shadow thereat rather than relative transparency. Thus for copper billets, graphite is a good tracer. For aluminum and magnesium, ferro-ferric oxide, $Fe_3O_4$, or lead oxide, PbO, may be used. For iron or steel billets, aluminum oxide, is effective.

The absorption of X-rays, further, varies with the third power of the wave-length. In general, longer wave lengths are preferable, for example by generating the X-rays from a copper rather than a tungsten target.

Figure 7:
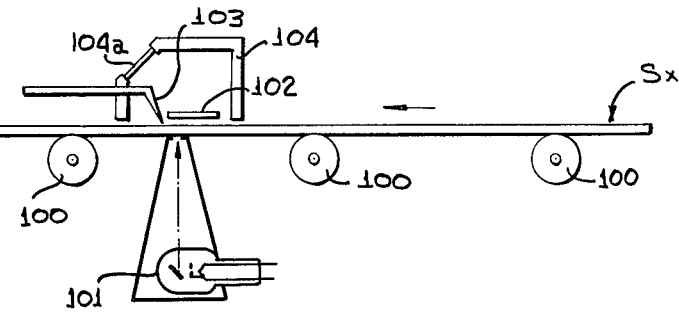
Figure 8:
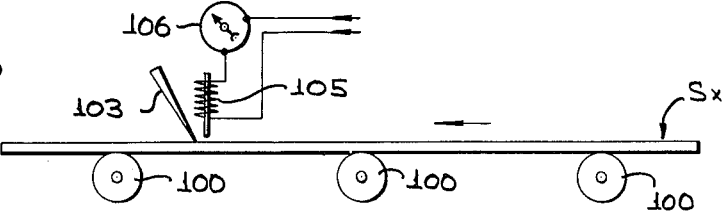
Figure 9:
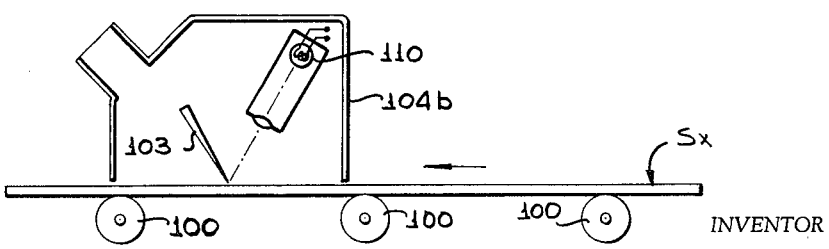

Detection of the location of the tracer lines may be accomplished as in FIGURES 7 to 9.

In FIGURE 7, a section Sx of the strip material is assumed to have one or more regions with tracer material of greater or lesser radiographic absorption than the rest of the strip. A source of X-rays, such as the emitter tube 101, directs its beam toward the strip Sx as it rests on rollers 100. In passing through the strip, there is greater or lesser absorption at the tracer region, and the transmitted beam encounters a detector 102, e.g. a thin layer of willemite or other substance responsive to X-rays, so that the location of the tracer region is indicated by the lesser or greater scintillation effects on the detector 102. A scriber 103 may be employed manually to designate the tracer region by indentation on the strip. A safety hood 104 of lead, with a lead glass window 104a, can be employed.

In FIGURE 8, the strip Sx is assumed to have one or more regions with tracer matter of magnetic iron oxide, $Fe_3O_4$, e.g. with aluminum, magnesium, copper or brass strip: the search coil 105 of a magnetometer responds to the presence of the tracer material by change in the reading of the meter 106; and the scriber 103 may be employed as before to designate the location of the area.

In FIGURE 9, the strip Sx is assumed to have a surface region of a fluorescent tracer material. A source 110 of ultraviolet light directs its beam upon the strip surface having such a marking: and the fluorescence indicates the location of the region, which can be permanently marked by the scriber 103. It is preferable to perform the detection in a dark room, or by use of a hood 104b, to shut off extraneous visible light.

In FIGURES 7–9, the tracer marking may be a line such as the lines 15, 83 or 68 of FIGURES 1–6, and the section Sx be arranged to travel on rollers 100 in the direction of the arrows shown with the line extending in the direction of travel; wherewith the marks of the scribers 103 will indicate any lateral change of location of the tracer line, as due to camber effects in rolling. The section Sx with like markings may also be placed so it travels with the tracer lines parallel to the axes of the rollers 100: wherewith the indicator systems indicate the arrival of a tracer line at the detection point, and the scribed mark employed for machine shearing.

Figure 10:
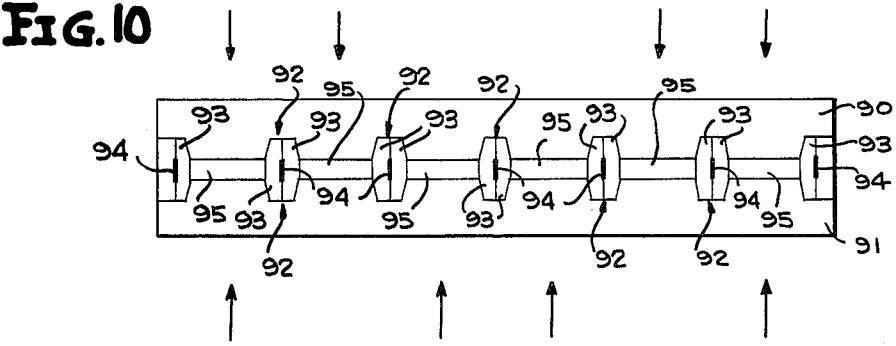

In FIGURE 10, two slabs 90, 91 are provided, each having a number of longitudinal grooves 92 which may be formed by milling the slab or during its extrusion. These grooves are filled by pairs of spacer pieces 93 corresponding to the spacer pieces 60 of FIGURE 4 in that tracer material 94 is present between the members of each pair, noting that such material 94 may be limited in dimensions in the direction between the rolled surfaces of the billet. The spacer pieces 93 can be tightly fitted in the grooves of the lower slab, and held by welding along the fillet angles. The spaces 95 between the pairs can then be filled with an anti-welding or resist material, e.g. a water slurry of a refractory substance, which is then dried. The upper slab is then placed in position and forced into place, e.g. by pressure in the direction of the arrows until a tight, coherent assembly is formed. This is then subjected to a schedule of heating and rolling, wherewith the slabs and spacers become roll-bonded together: and the rolling is continued, hot and cold as before, to attain a rolled strip of the desired total thickness. This strip has the residues of the tracer material 94 along its length, for detection as before.

Figure 11:
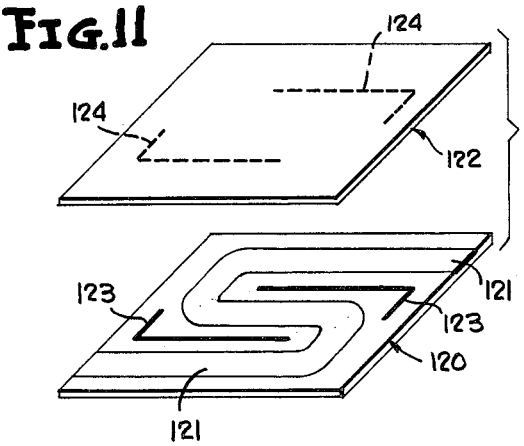
Figure 13:
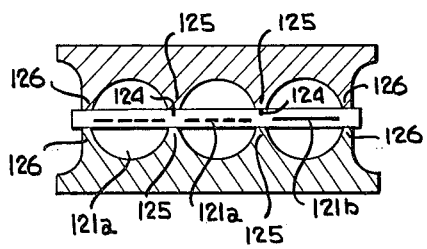
Figure 12:
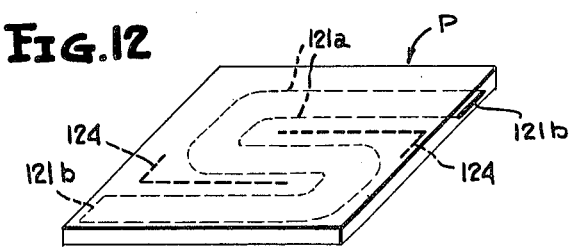
Figure 14:
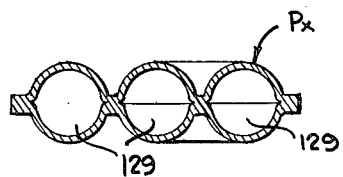
FIGURE 14 is an upright sectional view of the product from FIGURES 11–13.

In FIGURE 11, a sheet 120 has a pattern 121 printed thereon, of an anti-welding material, illustratively in a zigzag shape terminating at edges of the sheet. A second sheet 122 is applied, and the assembly rolled for bonding and minor extension to the form P shown in FIGURE 12, the resist regions being indicated by the dash lines 121a. According to this invention tracer markings 123 are applied to the sheet 120 before assembly as a composite billet for rolling. To expand the regions which have received the resist, the roll-bonded assembly has the locations of the tracer markings detected and marked as in FIGURES 7 or 8 above, and as shown at 124 on the top surface in FIGURES 12 and 13. The bonded assembly can then (FIGURE 13) be held in a press, with clamp edges 125 overlying and underlying the external markings 124 and clamp edges 126 spaced therefrom; wherewith these clamp edges 125, 126 are accurately located relative to the resist regions 121a, e.g. extending between edges of these regions. In FIGURE 13, the press bodies 127, 128 have the clamp edges 125, 126 integral therewith, with the surfaces between these edges of the shape desired for the expanded or opened article, these surfaces providing arches over the resist regions 121a and permitting access to the ends 121b thereof, FIGURE 13. Nozzle means are then inserted at one or both ends 121b, and pneumatic or hydraulic pressure employed to stretch the laminations at the resist regions to the form Px shown in FIGURE 14 with the zigzag passageway 129 therein. During this expansion to provide the passageways, the width and length of the rolled assembly P are not changed due to the clamping effect, and successive articles have the same dimensions. The use of internal pressure to expand or dilate such an assembly is of itself known: the present invention concerns a simple and easy manner of locating the assembly P accurately in the clamping press. The tracer material 123 can also be employed for locating regions at which trimming may be done before the expansion, and at which the nozzle means should be inserted.

Figure 15:
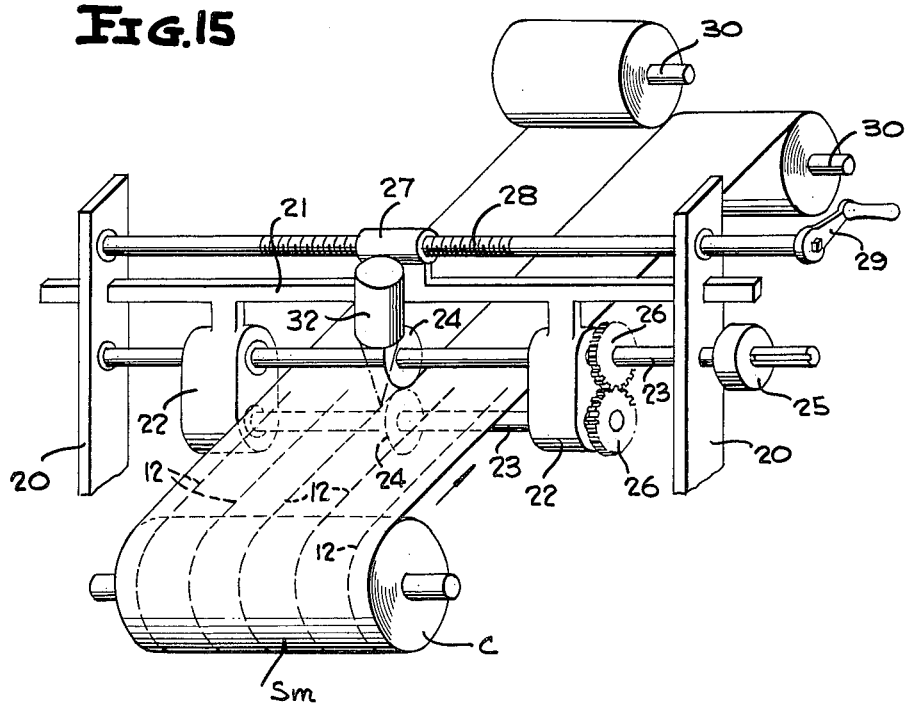
FIGURE 15 is a perspective view of a slitting apparatus, in conventionalized form, with employment of the invention.

In FIGURE 15 is shown an apparatus for visual observation of a fluorescent marking upon a rolled strip, and a slitting of the strip along such a marking.

For this, the billet 10 of FIGURE 1 can have the longitudinal internal channels 11 with anti-welding material therein, and longitudinal surface grooves 12 with a fluorescent material such as zinc sulfide therein. These grooves 12 are located in alinement with the spacing metal 13 between adjacent channels and between the sidemost channels and the edges of the billet, as indicated by the upright lines 14. Upon rolling the billet to form the strip S, FIGURE 2, the anti-welding material in the channels 11 extends in proportion to the lengthening of the billet in forming the strip: the marking material in the grooves 12 also extends and the billet metal flows to close the grooves upon the marking material while leaving lines 15 of such material as essentially invisible lines along the strip. The strip can be formed into a coil C, FIGURE 15.

In FIGURE 15, a support shown as posts 20 guides a laterally slidable frame 21 which has bearings 22 for the driven shafts 23 of a pair of cooperative slitting disks 24: the shafts can be driven from a splined pulley 25 and connected by gears 26. A nut 27 on the frame 21 engages the threaded stem or worm 28, also journaled in the support posts 20 and having a crank 29. Driven shafts 30 serve as re-coiling receiving drums for the split portions of the strip. A source of ultraviolet light in a housing 32 is mounted to illuminate a marker line 15 of the strip Sm closely adjacent the position of the slitting disks 24. With the disks 24 rotating, the free end of strip Sm is moved past them for initial slitting: and then the ends of the slit portions are connected at shafts 30 so the rest of the strip is drawn past the slitting disks. By rotating the crank 29, the position of the disks is shifted so they engage the strip at the visually observable line 15 at which slitting is to be performed. If the line 15 varies in position, as by camber of the strip Sm, the slitting can be shifted so that the cut occurs between the channel residues 11, and does not enter these residues.

Figure 16:
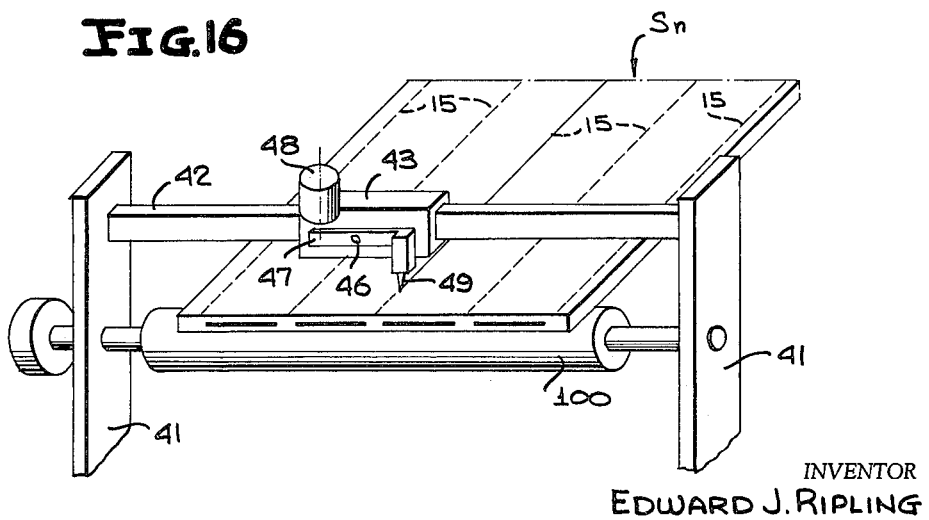
FIGURE 16 is a like view of an automatic marking apparatus with employment of the invention.
Figure 17:
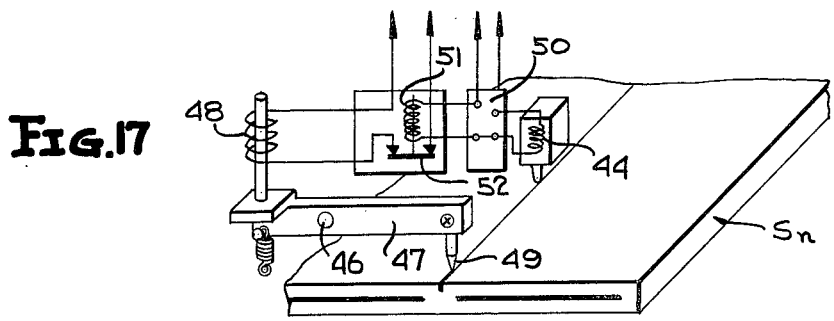
FIGURE 17 is a like view of a part of FIGURE 16, and showing a sensing device and associated circuits.
Figure 18:
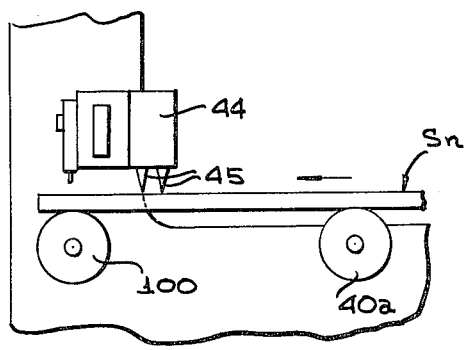
FIGURE 18 is an upright sectional view of the apparatus in FIGURES 16 and 17, taken on a plane in the direction of strip travel.

In FIGURES 16-18 is conventionally shown a means of detecting and marking a rolled strip which has been prepared as in FIGURES 2, 3a or 6, with a permanently ferromagnetic material employed for the marking strips 15, 83, or 68, of which stripes 15 are illustratively shown in FIGURES 16 and 17.

A supporting roller 100 is rotatable in supporting posts 41. These posts also have a guide rail 42 fixed thereto, extending parallel to the roller 100. A carriage 43 can be moved along the rail, and is guided thereby so the search coil 44, FIGURES 17 and 18, corresponding to the reproducing head of a tape recorder, is located with its search poles 45 close to the upper surface of the rolled strip Sn which rests on roller 100 and can also be supported by other rollers 40a. The carriage 43 also has a pivot 46 for a hammer lever 47 which can be rocked clockwise in FIGURE 17 when the solenoid 48 is energized, and thereby force its scriber 49 into the surface of the strip Sn. The search coil 44 is shown connected to an amplifier 50, and this amplifier in turn is connected to energize the coil 51 of a relay when the response at the search coil 44 has reached a predetermined value. The bridge 52 of the relay then closes a charging circuit for the solenoid 48, so the scriber 49 indents the strip S. As illustrated, the search poles 45 and the scriber 49 may be located in a plane radial to the axis of the roller 100, and the indentations formed by the scriber 49 are at the stripe 15 then being scanned by the poles 45. By fixing the search coil 44 and its poles 45 at a different radial plane of the roller 100 than the scriber 49, the indentations can be located as desired relative to the stripe 15 being scanned. While the scriber 49 is being held in contact with the rolled strip Sn, movement of the strip Sn over the roller 100, as by driving the roller by pulley 55 will cause a scribed line to be formed on the strip Sn so long as the search poles 45 overlie a stripe 15. If the carriage 43 or the strip Sn is shifted along the axis of the roller 100, or the stripe 15 changes direction, e.g. due to camber of the rolled strip S, the search coil 44 produces a lesser response, the relay coil 51 is no longer able to hold its bridge 52 in position to charge the solenoid 48, and the scriber 49 is lifted from contact with the strip Sn by the spring 58. Thus when the strip Sn comprises a section formed by transverse cuts, the movement of the carriage 43 parallel to the roller 100 will cause the scriber 49 to form indentations at each stripe 15 and thus enable the insertion of a knife point at each of the resist layers 11 to start the opening of the channels in the strip section, and the guidance of slitters for severing the multi-wide rolled strip Sn into narrower strips along lines passing through the rolled spacer metal parts 13 and thus located between adjacent layers of resist 11 without intruding into such layers.

It will be noted, for FIGURES 17 and 18, that the stripes 15 can be located at either surface of the rolled strip Sn, or be hidden within the strip as shown for marker lines 68 and 83 in FIGURES 6 and 3a.

The carriage 43 of FIGURES 16-18 can be employed to support a radiographic detecting system as in FIGURE 7, and connected for operating the stem or worm 28 of FIGURE 15.

Figure 19:
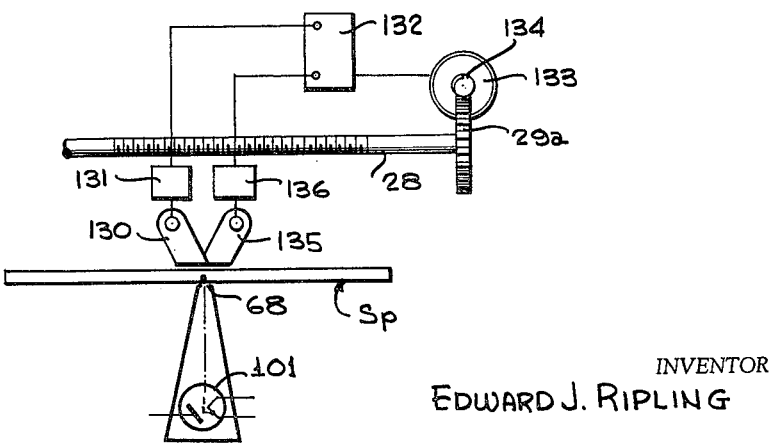
FIGURE 19 is an end view, in conventionalized form, of an apparatus for radiographically sensing a tracer stripe as in FIGURE 7, and connected for automatically moving the slitters of FIGURE 15 in response to the sensed location of the stripe.

Thus in FIGURE 19, such an assembly is conventionalized for an apparatus for slitting a strip Sp having an internal tracer stripe 68 of material as set out above in FIG. 6 and having a different transmission effect than the metal itself, for the X-ray beam from the source 101, with the beam having a uniform intensity over an area about ½ inch wide and extending about one inch along the direction of the tracer stripe and thus parallel to the travel of the strip Sp. Two Geiger-Muller or like detectors of known type are employed, each having a window about ¼ inch wide and ½ inch long, being staggered laterally relative to one another with an overlap of a few thousandths of an inch. The detector 130 at the left is connected through an amplifier 131 to control a Wheatstone bridge and reversing switch 132 for the motor 133 which drives a worm 134 and thus turns the worm wheel 29a on the threaded stem 28, wherewith slitters 24 as in FIGURE 15 are caused to move laterally in one direction. The detector 135 at the right acts through an amplifier 136 and the bridge and reversing switch 132 to cause the motor 123 to turn in the opposite direction and thus cause the slitters 24 to move laterally in the other direction. Thus, if the transmitted beam acts only on one detector 120 or 135, movement of the stem 28 is produced for moving the slitters correspondigly, and thus to follow any camber curvature of the tracer stripe 68. Such follower devices of themselves are known, with detectors for the edge of a travelling web, and effective for shifting the web for maintaining its path of travel: and are not claimed in detail herein. When the tracer stripe 68 underlies the overlap of the two detectors, the bridge has no significant current flow because the two detector or pickup devices give equal and balanced responses, and the motor 133 is deenergized.

The illustrative practices are not restrictive, and the invention can be employed in many ways within the scope of the appended claims.

What is claimed is:
1. The method of preparing metal articles having channels therein, which comprises preparing a billet having metal portions enclosing a mass of anti-welding material and also having a mass of a second material distinct from the metal of the billet in having a different response to electromagnetic excitation, said masses being at predetermined locations relative to one another and being competent of extruding during the rolling of the billet, rolling the billet to form a strip in which the said anti-welding material remains hidden between surface layers of rolled-out metal and both said materials extend along the strip, detecting by electromagnetic means the location in the rolled strip of the rolled-out mass of the second material prior to the separation of the said surface layers, mark- ing the exterior of the strip at at least one point correlated to the detected location of said mass of second material, severing the strip longitudinally along a line spaced from the rolled-out mass of the anti-weld material and at a predetermined lateral spacing relative to the marking.

2. The method of claim 1, in which the marking is by cutting into the rolled product.

3. The method of claim 1, in which the second material is responsive to ultraviolet light, and said mass thereof is at the surface of the billet and the rolled product, and in which the detection is by directing an ultraviolet light at said rolled product.

4. The method of claim 1, in which the second material is chosen so as to have a different transmission coefficient for X-rays than the metal, and in which the detection is by directing an X-ray beam through the rolled product.

5. The method of claim 1, in which the second material is chosen so as to be magnetically responsive, and in which the detection is accomplished by moving the rolled product relative to an electric induction device and indicating the current induced in said device.

6. The method of claim 1, in which the billet is prepared as a body having the mass of anti-welding material therein; and in which a narrow groove is cut into a roll-engaging surface of the billet, the second material is deposited at the root of said groove, and the outer part of the groove is closed prior to the rolling, whereby the rolled product has said second material as a tracer line located wholly within the rolled product.

7. The method of claim 1, in which the billet is prepared from spaced slabs, with spacer members between the slabs and spaced laterally, each spacer member having associated therewith a mass of the second material, the anti-welding material being located between pairs of adjacent laterally spaced members.

8. The method of claim 1, in which the response to the detecting step is employed for shifting the point of marking.

9. The method as in claim 1, in which the billet is prepared with the said masses being placed in laterally spaced arrangement essentially in the same transverse plane.

10. The method as in claim 9, in which several masses of the anti-welding material are provided in longitudinally extending and laterally spaced relationship, and a plurality of masses of the second material are provided in the form of longitudinally spaced stripes, with at least one of said stripes located at each portion of width of the billet which is between a pair of masses of said anti-welding material.

11. The method of preparing and separating multi-wide laminate metal strips into narrow strips, which comprises preparing a billet having a plurality of longitudinally extending and laterally spaced internal channels therein and also having within the same and between adjacent edges of two of said channels a longitudinally extending continuous stripe of material distinct from the metal of the billet in that it has a different response to electromagnetic excitation, rolling the billet with anti-welding material in said channels whereby to form a strip having a plurality of longitudinal discontinuities spaced laterally from one another with each two adjacent discontinuities separated by portions of the rolled metal of the billet and with such metal portions each having therein a longitudinally extending residue of said distinct material, exposing the strip to electromagnetic excitation whereby to render the material perceptible, detecting and indicating the locations of the said distinct material, and severing the said metal portions at a longitudinal region thereof in selected relations to said indicated locations.

12. The method as in claim 11, in which the channels are located in a plane extending across the billet, and the said distinct material is located in the said plane.

13. The method as in claim 11, in which the said distinct material includes an element of different atomic number from the major metal content of the billet, and the detection is by passage of X-rays through the strip.

14. The method as in claim 11, in which the said distinct material is responsive to ultraviolet light, and the stripes thereof are located at a roll-engaged surface of the billet, and in which the detection is by directing an ultraviolet light at said rolled product.

15. The method as in claim 11, in which the said distinct material is a ferromagnetic substance, and the detecting and indicating is by employing said ferromagnetic substance to induce an electrical current.

References Cited by the Examiner

UNITED STATES PATENTS

| | | | |
|---|---|---|---|
| 2,495,545 | 1/50 | Peterson et al. | 29—407 |
| 2,896,312 | 7/59 | Schell | 29—157.3 |

WHITMORE A. WILTZ, *Primary Examiner.*

THOMAS H. EAGER, *Examiner.*